United States Patent [19]

Dickerson

[11] 4,299,635
[45] Nov. 10, 1981

[54] FLOW CHARACTERISTICS OF SYNTHETIC IRON OXIDE

[76] Inventor: Theodore Dickerson, 106 Curve Dr., Monroe, La. 71203

[21] Appl. No.: 23,480

[22] Filed: Mar. 23, 1979

[51] Int. Cl.³ .......................... C09C 1/24; C09C 3/06
[52] U.S. Cl. ................................ 106/308 B; 106/304; 423/633
[58] Field of Search ............................. 106/304, 308 B

[56] References Cited

U.S. PATENT DOCUMENTS

| 2,785,991 | 3/1957 | Bennetch | 106/304 |
| 3,009,821 | 11/1961 | Bennetch | 106/304 |
| 3,947,502 | 3/1976 | Leitner | 423/633 X |
| 4,082,905 | 4/1978 | Stephan et al. | 106/304 |

FOREIGN PATENT DOCUMENTS 54749  3/1967  German Democratic Rep. .................................. 106/304

Primary Examiner—Helen M. McCarthy

[57] ABSTRACT

Copperas is calcined, ground, washed, dried, and milled to give a roasted copperas red, suitable as a paint pigment. The flow characteristics of the oxide, during processing, and the dispersibility of the pigment in paint are improved by the addition of 0.5–10 wt. % $SiO_2$ to the iron oxide after the washing step.

7 Claims, 1 Drawing Figure

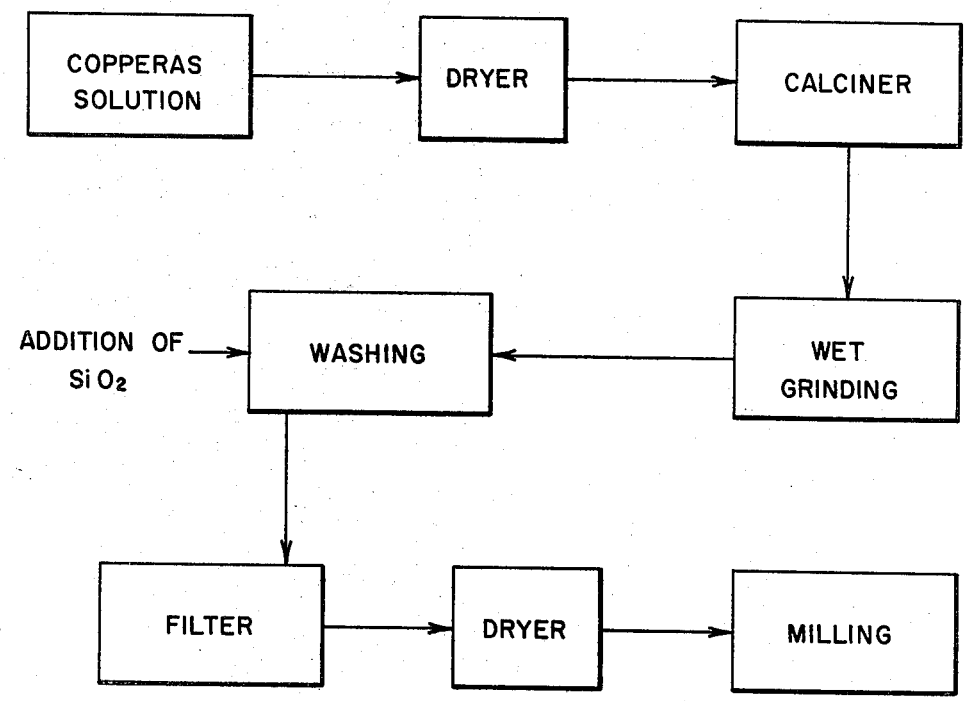

FLOW CHARACTERISTICS OF SYNTHETIC IRON OXIDE

BACKGROUND OF THE INVENTION

This invention relates to synthetic iron oxides. More particularly, the invention relates to synthetic red iron oxide prepared from soluble iron salts. More particularly, the invention relates to a method of improving the flow characteristics and dispersibility, such as in paint, of synthetic red iron oxide prepared from soluble iron salts.

Iron oxide, either natural or synthetic, is a well-known pigment. Among the synthetic oxides are black, yellows, browns, tans, and reds. The black and brown oxides contain varying ratios of ferrous and ferric oxides. Yellow iron oxides are the monohydrate of ferric oxide ($Fe_2O_3.H_2O$). Tan oxides are a new class of iron oxide pigments, in which iron oxide is reacted with other metallic oxides to form a series of chemical compounds known as ferrites. For example, zinc ferrite theoretically contains 33.7% zinc oxide, but in practice varies from about 32% to about 34%, with the remainder being ferric oxide. Similarly, magnesium ferrite contains about 20% magnesium oxide. Synthetic red oxides can be made by 4 different methods. "Ferrite reds" are made by dehydrating the yellow oxide, thus converting the ferric oxide monohydrate to $Fe_2O_3$. Another method is to precipitate black or brown oxide and then calcine at red heat to the ferric oxide state. The third method gives what is often referred to as "precipitated reds", made by direct precipitation from a solution of ferrous salts. The fourth method makes roasted "copperas reds". Copperas ($FeSO_4.7H_2O$) is purified to remove other metallic salts and is then dehydrated to the monohydrate ($FeSO_4.H_2O$). The monohydrate is calcined (roasted) to give red alpha $Fe_2O_3$ (copperas red). The present invention is primarily concerned with improving the flow characteristics and dispersibility of roasted copperas reds, but is applicable to all synthetic iron oxides. "Copperas reds" are chosen as the preferred embodiment.

Prior art inventions in the field of iron oxide technology are exemplified by U.S. Pat. Nos. 2,184,738, 2,394,579, 2,416,138, 2,620,261, 2,980,617, and 3,009,821.

As mentioned above, copperas reds are typically prepared by calcining copperas. The crude product is then milled to give material of proper particle size, for good dispersibility in a medium, such as paint. A typical problem found in processing copperas reds, and other synthetic oxides, has been a low through-put of product through the mills, due to frequent plugging and jamming of the mills. The energy input required per pound of milled product has been high, resulting in a high cost product. Contamination of the ultimate product, from plugs breaking loose during milling, has been a common complaint.

SUMMARY OF THE INVENTION

The above-mentioned problems and advantages of the prior art are reduced by the present invention, in which a silicon-containing material is added to the crude product, prior to the filtration step.

This method of improving the flow characteristics of synthetic iron oxide prepared from soluble iron salts comprises the steps of (a) calcining an iron salt, to give a crude roasted red product,
(b) grinding the crude roasted red product,
(c) washing the ground crude product,
(d) adding a silicon-containing material selected from the group consisting of fumed silica, precipitated silica, and $Me_xSi_yO_z$ to the washed product, in an amount sufficient to give a range of about 0.5–10 wt.% $SiO_2$ in the finished iron oxide product,
(e) filtering and drying the product of step (d), and
(f) milling the dried product to reduce the agglomerated particles formed in step (e).

BRIEF DESCRIPTION OF THE DRAWING

A block diagram of the typical steps in the production of roasted copperas reds is shown in the FIGURE. The process of the invention starts with the calciner.

DESCRIPTION OF THE PREFERRED EMBODIMENTS

The prior art preparation of red iron oxides is well known and will not be discussed here in detail. Reference is made to various topics concerning iron oxide, such as "Pigments (Inorganic)", found in the "Encyclopedia of Chemical Technology" by Kirk-Othmer.

The soluble iron salts that are the raw material for the product iron oxide can be any of the available and known iron salts, such as ferrous sulphate and ferrous chloride. Copperas ($FeSO_4.7H_2O$) is the best-known and preferred soluble iron salt. Among other sources, it is a by-product of a titanium dioxide process. For use in the preparation of iron oxide, the crude copperas (typically received in crystalline form) is purified and dried to the monohydrate ($FeSO_4.H_2O$) form. This monohydrate form is then calcined.

Calcining is a well-known process and will not be discussed in detail here. Copperas, a well-known industrial product, is the raw material for the process. After proper drying and calcination, the crude copperas, now converted to the red oxide product, is ground to produce a product having a specified sieve residue, such as less than 0.02 wt.% on a 325 mesh U.S. sieve. Wet grinding is one commonly-used method of grinding.

The ground red oxide is then washed to reduce the concentration of residual soluble salts, so as to give an end product having a satisfactory low level of said salts. The major interfering ions are soluble iron and sulfate ions. After washing, this concentration is preferably less than about 0.5 wt.%.

The next step, preferably, is the addition of the silicon-containing material to the washed product. This material can be added in any convenient manner, such as by adding the dry material, with agitation, to a water slurry of the ground crude product. Another method is to prepare a water slurry or solution of the silicon-containing material and add this to the proper amount of iron oxide slurry. The absolute concentration of the silicon-containing slurry or solution to be added is not critical. If the slurry is too dilute, an unnecessarily large volume of mixture must be filtered. On the other hand, if the slurry is too concentrated, a good dispersion of silicon-containing material in the slurry, and subsequent mixing with the iron oxide material, will be difficult to obtain. Generally, a 10 to 15 wt.% mixture of the silicon-containing material in water offers a reasonable compromise. The amount of silicon-containing material added is sufficient to give a range of about 0.5–10 wt.%

$SiO_2$, preferably 0.5–5 wt.%, and most preferably 0.5–1.5 wt.%, in the finished iron oxide product.

The silicon-containing material is chosen from a group consisting of fumed silica, precipitated silica, and $Me_xSi_yO_z$, in which Me=an alkali metal, x=2,3, or 4, y=2,3, or 4, and z=an integer having a value from 3 to 9. Sodium and potassium silicate are the preferred alkali metal silicates. Various formulas of "sodium silicate" are known, such as $Na_2SiO_3$, $Na_2O\,(SiO_2)_3$, $Na_2Si_4O_9$. One commercially-available sodium silicate, such as "Sodium Silicate-N grade", produced and sold by Philadelphia Quartz co., has the formula $Na_2O\,(SiO_2)_3$ and is sold as a solution containing 28% wt. $SiO_2$. The alkali metal silicates, in water solution, decompose to form silica.

As an alternative to the alkali metal silicate described above, fumed or precipitated silica can be added. The silica is typically mixed with water and added as a slurry. Enough silica, such as Cab-O-Sil M-5 (produced by Cabot Corp.), is added to give a range of about 0.5–10 wt.% $SiO_2$ in the finished iron oxide product.

The addition of the silicon-containing material in the process, at least in one embodiment, takes place after the crude product has been ground and washed. Since the actual operations of grinding and washing are often combined into one operation, it is not necessary to wait until the wash step is completed before adding the silicon-containing material. If sodium silicate is the material to be added, a solution of the silicate can be added to the washed, ground iron oxide near the end of the wash cycle, when the concentration of residual soluble salts is reduced to a satisfactory level, such as less than about 0.5 wt.%. Or the silicate solution can be added as the washed, ground iron oxide slurry is entering the filtration step. The idea of adding the silicate solution is to coat the iron oxide particles with at least some silica. This addition can be done any place where such a coating can take place, without other unwanted side reactions occurring.

The addition of fumed or precipitated silica, either in a slurry or dry powder, is less critical in the steps of the operation. Since these forms of silica are not soluble and do not interact with the typical interfering soluble ions, the silica can be added at any time after the calcining step, such as during the wet grinding, washing, filtration or final drying step. Again, coating of the iron oxide particles is the desired result. As long as a suitable coating is obtained, the exact method and location of the addition of the silicon-containing material is not critical, as long as sodium silicate is added when the concentration of residual soluble salts is reduced.

The filtration and drying steps of the silicon-containing copperas red product are well-known and present no problems. Vacuum drum filters and continuous dryers are examples of the equipment used.

The advantages of the present invention appear when the filtered and dried material is ready for its final milling step. As mentioned before, at this point in the prior art process, caking of the product in the mill and plugging and jamming of the mill resulted in a low throughput rate. A possible reason for the plugging and jamming was agglomeration of the oxide particles into lumps that did not have good flow characteristics. Also, if a plug were to break loose within the mill, this might result in uneven milling of the product, giving an improper particle size distribution, which in turn could lead to contamination of the product and poor dispersibility. The addition of the silicon-containing material to the product stream appears to give a type of coating to the iron oxide particles, reducing their tendency to agglomerate and plug, thus giving a better flowing product that can be milled to the proper particle size. At the same time, an increased product through-put, due to a lack of plugging or jamming of the mills, results in a lower energy input per lb. of product, thus reducing the cost of the ultimate product.

A typical procedure embodying the steps of the process follows:

(a) based on the procedure described in U.S. Pat. No. 2,394,579 (Ayers), 1,000 lbs. of copperas (purified commercial grade, dried to the monohydrate) were fed, at a proper rate, into a rotary calciner (temperature=1250°–1600° F.; rotation speed=1 rpm; heated by gas or oil, direct or indirect). The residence time in the calciner was about 3–4 hours, and the resultant product had a typical copperas red color.

(b) wet grinding was carried out, to give a crude ground product having less than 0.02% wt. residue on a 325 mesh screen (U.S. Sieve).

(c) the crude ground slurry was then poured, with agitation, into a container of water, to remove interfering soluble ions.

(d) in a separate container, a slurry of fumed silicca (Cab-O-Sil M-5, produced by Cabot Corp.) was prepared, containing about 6.0 wt.% of $SiO_2$. The total amount of $SiO_2$ added was sufficient to give about 0.5–5 wt.% $SiO_2$ in the finished iron oxide product. This water slurry was added, at ambient temperature and with agitation, to the washed copperas red slurry.

(e) the silica-ferric oxide mixture was then vacuum filtered and dried, on a steam-heated continuous dryer, to less than 1% moisture.

(f) the dried red iron oxide product (in which the particles have a covering of silica) was then milled in a hammermill with internal air classification to give a finished product having agglomerates of $10\mu$ or less.

The above steps are shown in the FIGURE.

The milled product from the final step is suitable for use as a pigment, such as in paint.

The advantages of the present invention are shown in the results of the milling operation described below. For comparison, milling data of a product obtained by the above-described procedure (omitting the addition of the silicon-containing material) is compared with milling data obtained from using various levels of various silicon-containing materials. In these tests, each run was made with 30 lbs. of filtered and dried feed stock. Between runs, the mill and the collection equipment were cleaned to prevent cross-contamination between samples. The test was carried out on a pilot-size hammermill with internal air classification, such as manufactured by Mikropul Corp. The mill feed screw had a variable speed drive to permit a range of feed rates.

| Run | Treatment | Maximum Feed Rate (lbs./hr.) | Load Lbs./HP | Cowles Dispersion Test (Hegman Scale) |
|---|---|---|---|---|
| A | No additive | 38.8 | 11.1 | 6 |
| B | 0.5% fumed silica | 105.2 | 24.6 | 6.5 |
| C | 1% fumed silica | 147.14 | 30.5 | 5.5 |
| D | 0.5% $SiO_2$, as sodium silicate* | 247.8 | 50.98 | 6.5 |
| E | 1% $SiO_2$, as | 227.6 | 49.8 | 6.75 |

| Run | Treatment | Maximum Feed Rate (lbs./hr.) | Load Lbs./HP | Cowles Dispersion Test (Hegman Scale) |
|---|---|---|---|---|
| | sodium silicate* | | | |

*Enough sodium silicate solution was mixed with the iron oxide to give a resultant product containing the listed wt. % of silica.

The above results show that the addition of silicon-containing material to the washed and ground synthetic iron oxide (a) increased the maximum feed rate markedly, and (b) reduced the energy input needed to mill the product.

While the present invention has been described herein with reference to particular embodiments thereof, it will be appreciated by those skilled in the art that various changes and modifications can be made without departing from the scope of the invention as set forth.

I claim:

1. A method for improving the flow characteristics of synthetic iron oxide prepared from soluble iron salts, comprising the steps of
   (a) calcining copperas, to give a crude roasted copperas red product,
   (b) grinding the crude roasted red product,
   (c) washing the ground crude product,
   (d) adding a silicon-containing material selected from the group consisting of fumed silica, precipitated silica, and $Me_xSi_yO_z$ to the washed product, in an amount sufficient to give a range of about 0.5-10 wt.% $SiO_2$ in the finished iron oxide product,
   (e) filtering and drying the product of step (d), and
   (f) milling the dried product to reduce the agglomerated particles formed in step (e).

2. The method of claim 1 wherein fumed silica or precipitated silica are added before washing step (c).

3. The method of claim 1 wherein $Me_xSi_yO_z$ is added during washing step (c) at a point in the washing step where the concentration of interfering ions is less than about 0.5 wt. %.

4. The method of claim 3 wherein the major interfering ions are soluble iron and sulfate ions.

5. The method of claim 1 wherein, in the formula $Me_xSi_yO_z$, Me=an alkali metal, x=2,3, or 4, y=2,3, or 4, and z=an integer having a value from 3 to 9.

6. The method of claim 5 wherein $Me_xSi_yO_z$ is $Na_2O(SiO_2)_3$, equivalent to $Na_2Si_3O_7$.

7. The method of claim 1, wherein
   (a) the calcining temperature is in the range of 1250°-1600° F. (676°-871° C.),
   (b) the calcining time is in the range of 0.5 to 4 hours,
   (c) the crude product is ground (in step b) to result in less than 0.02% wt. residue on a 325 screen sieve,
   (d) the dried product is milled (in step f) to reduce the size of the agglomerates to 10μ or less, and
   (e) the amount of silicon-containing material added is sufficient to give a range of about 0.5-1.5 wt. % $SiO_2$ in the finished iron oxide product.

* * * * *